(12) United States Patent
Rowe (10) Patent No.: US 10,436,346 B1
(45) Date of Patent: Oct. 8, 2019

(54) PRESSURE REGULATING VALVE WITH INCORPORATED SHUT-OFF MECHANISM AND FLUID BYPASS

(71) Applicant: Carroll G. Rowe, Washington, AR (US)

(72) Inventor: Carroll G. Rowe, Washington, AR (US)

( * ) Notice: Subject to any disclaimer, the term of this patent is extended or adjusted under 35 U.S.C. 154(b) by 156 days.

(21) Appl. No.: 15/714,276

(22) Filed: Sep. 25, 2017

Related U.S. Application Data (63) Continuation-in-part of application No. 15/206,037, filed on Jul. 8, 2016, now Pat. No. 9,891,635, which
(Continued)

(51) Int. Cl.
*G05D 16/20* (2006.01)
*F16K 31/363* (2006.01)
(Continued)

(52) U.S. Cl.
CPC .......... *F16K 31/363* (2013.01); *F16K 1/126* (2013.01); *F16K 17/065* (2013.01); *F16K 31/60* (2013.01); *G05D 16/10* (2013.01); *G05D 16/166* (2013.01); *G05D 16/187* (2019.01); *G05D 16/2024* (2019.01); *G05D 16/2086* (2013.01); *G05D 16/2093* (2013.01); *G05D 16/2097* (2019.01); *Y10T 137/7768* (2015.04); *Y10T 137/7769* (2015.04); *Y10T 137/7805* (2015.04);
(Continued)

(58) Field of Classification Search
CPC ......... Y10T 137/7805; Y10T 137/7819; Y10T 137/7806; Y10T 137/7807; Y10T 137/7816; Y10T 137/7818; Y10T 137/7825; Y10T 137/7769; Y10T 137/7768; G05D 16/10; G05D 16/18; G05D 16/187; G05D 16/166; G05D 16/2093; G05D 16/2097; G05D 16/2024; G05D 16/2086; G05D 16/0153; F16K 1/126; F16K 31/363
See application file for complete search history.

(56) References Cited

U.S. PATENT DOCUMENTS

2,627,873 A * 2/1953 Bothe ............... E03D 3/04
251/25
3,907,248 A * 9/1975 Coulbeck ............. F16K 31/122
251/30.02
(Continued)

*Primary Examiner* — Atif H Chaudry (57) ABSTRACT

A pressure regulator has a pressure chamber connected to an inlet flow area which receives liquid flow. As liquid flows into a forward chamber of the pressure chamber, pressure is exerted on the forward face of the piston, which in turn causes the piston to slide longitudinally through the pressure chamber. A bypass fluidically connects the forward pressure chamber and rear pressure chamber such that as the piston slides into the rear pressure chamber pressure increases at the rear pressure chamber, which in turn forces the piston to move forwardly, thus regulating flow out of the pressure chamber. A hand wheel is configured to turn a movable plate located inside the pressure chamber, with the movable plate configured to impede the piston from moving rearwardly. Pressure sensors and vents with a pressurized air source may be used to keep the pressure within a desired range.

13 Claims, 11 Drawing Sheets

Related U.S. Application Data is a continuation-in-part of application No. 15/493,415, filed on Apr. 21, 2017, now Pat. No. 10,203,705.

(60) Provisional application No. 62/460,755, filed on Feb. 18, 2017, provisional application No. 62/333,451, filed on May 9, 2016, provisional application No. 62/326,056, filed on Apr. 22, 2016, provisional application No. 62/190,630, filed on Jul. 9, 2015.

(51) Int. Cl.
| | | |
|---|---|---|
| *G05D 16/16* | (2006.01) | |
| *G05D 16/18* | (2006.01) | |
| *F16K 31/60* | (2006.01) | |
| *F16K 17/06* | (2006.01) | |
| *F16K 1/12* | (2006.01) | |
| *G05D 16/10* | (2006.01) | |

(52) U.S. Cl.
CPC .... *Y10T 137/7807* (2015.04); *Y10T 137/7815* (2015.04); *Y10T 137/7816* (2015.04); *Y10T 137/7818* (2015.04); *Y10T 137/7819* (2015.04); *Y10T 137/7825* (2015.04)

(56) References Cited

U.S. PATENT DOCUMENTS

| | | | | |
|---|---|---|---|---|
| 3,946,756 A | * | 3/1976 | Specht | F16K 31/145 |
| | | | | 137/495 |
| 2002/0036013 A1 | * | 3/2002 | Inayama | G05D 16/2024 |
| | | | | 137/487.5 |

\* cited by examiner

PRESSURE REGULATING VALVE WITH INCORPORATED SHUT-OFF MECHANISM AND FLUID BYPASS

CROSS-REFERENCE TO RELATED APPLICATIONS

This application claims is a continuation-in-part of U.S. patent application Ser. No. 15/206,037, filed on Jul. 8, 2016, and entitled "Dual-Piston Pressure Reducer", and is also a continuation-in-part of U.S. patent application Ser. No. 15/493,415, filed on Apr. 21, 2017, and entitled "Pressure Reducing Valve with Incorporated Shut-Off Mechanism." The complete disclosures of these applications are hereby incorporated by reference.

STATEMENT REGARDING FEDERALLY SPONSORED RESEARCH OR DEVELOPMENT

Not applicable.

BACKGROUND OF THE INVENTION

Pressure control valves, or pressure regulators, are used to automatically increase, decrease, turn on, turn off, or otherwise regulate the flow of a liquid or gas at certain pressures. In many cases, these valves serve to maintain a reduced outlet pressure regardless of variations in the inlet pressure of the fluid. These types of pressure reducing valves are used primarily for safety purposes and can be implemented in a variety of areas, including the aircraft industry, cooking, the oily and gas industry, and many others. In one application, pressure control valves are used in compressed air foam systems (CAFS) used for firefighting, in which the value may be used to deliver an appropriate quantity of water or a mixture of water and surfactant. Many existing pressure control valves and regulators use a spring loaded poppet valve as the pressure reducing or restrictive element and a diaphragm to sense the pressure changes. A spring is typically used to exert a force on the sensing element and to open the valve.

BRIEF SUMMARY OF THE INVENTION

The present invention is directed to a pressure control valve or flow regulator with an incorporated shut-off mechanism for use between a pressurized liquid source and a pump inlet (the pump inlet being fluidically connected to the pressure regulator outlet). The flow regulator uses a piston with multiple faces. Rather than a poppet valve, the piston moves axially within a pressure chamber as the pressure regulating component. The piston is capable of moving freely toward and away from the outlet port allowing the user to control the flow to the discharge port. The piston, when positioned entirely forward such that it contacts the outlet port, is able to prevent the flow of liquid into the discharge port altogether.

When used in a compressed air foam system, the invention allows the engine powering the system to run at an increased rpm at the same discharge pressure. This provides numerous advantages in practical firefighting applications. This invention is also advantageous in foam concentrate proportioning systems using what is commonly called "around the pump" systems, where a portion of the discharge pump is routed through a venturi back into the suction side of the pump. In this use, the venturi is used to introduce foam concentrate into the stream of water being pumped. For the venturi to be effective in producing the volume of foam concentrate required, a specified differential of pressure between the inlet and pressure side of the pump is necessary. The invention is capable of producing this differential of pressure.

In certain implementations of the pressure regulator of the present invention, the flow regulator may further include a hand wheel attached at the rear of the pressure chamber. By turning the hand wheel, a moveable plate within the pressure chamber is brought forward, and thus the available stroke of the piston is reduced. This provides a manual override function for the regulator. When the hand wheel is turned such that the moveable plate is in the most forward position, the piston is held in place against the outlet port surface such that the flow is cut off entirely; conversely, when the hand wheel is turned such that the moveable plate is in the fully rearward position, full articulation of the valve is possible, thereby allowing full flow through the regulator.

In certain implementations of the pressure regulator air pressure sensors in communication with air valves may be used to regulate a pressurized air source input to the flow regulator to maintain the air pressure between a desired high and low value. The output regulated pressure range in these implementations would be a function not only of the ratio of the faces of the piston but also of the pre-set minimum and maximum air pressures.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Figure 1:
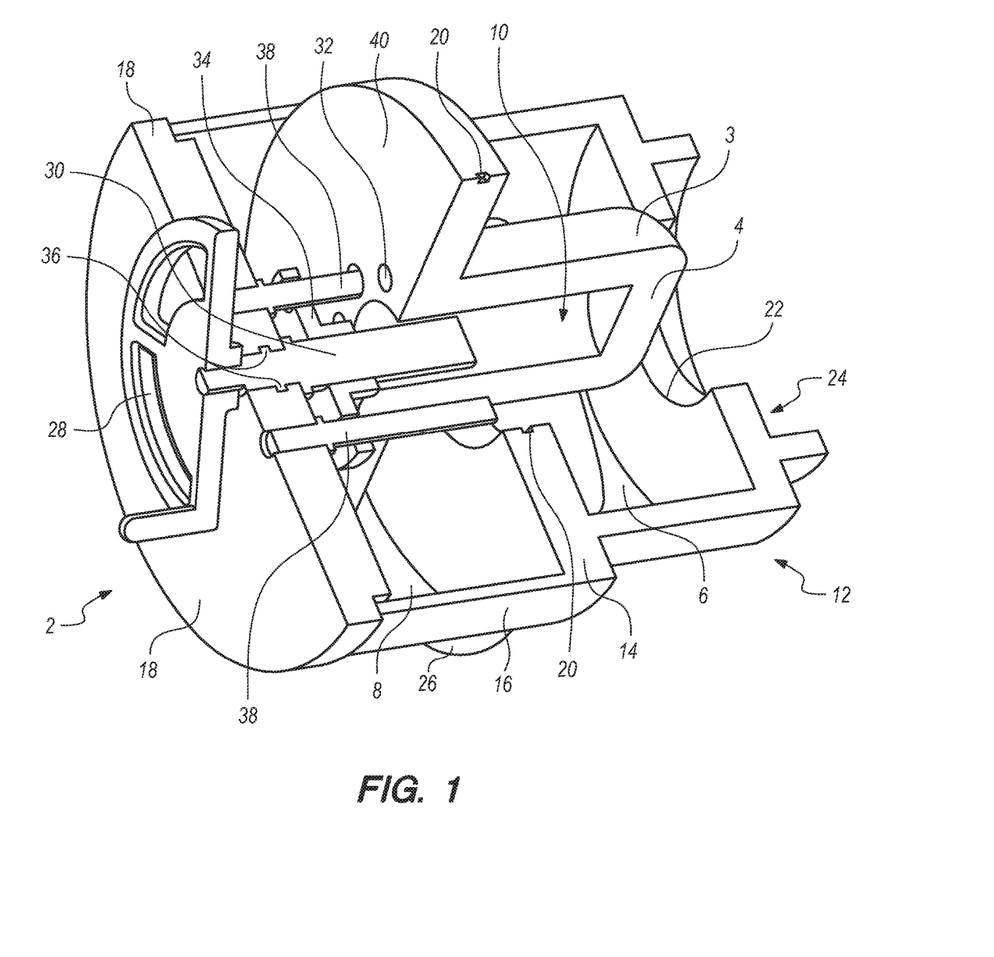
FIG. 1 shows a first embodiment of the pressure regulator of the present invention in partial cut-away.
Figure 2:
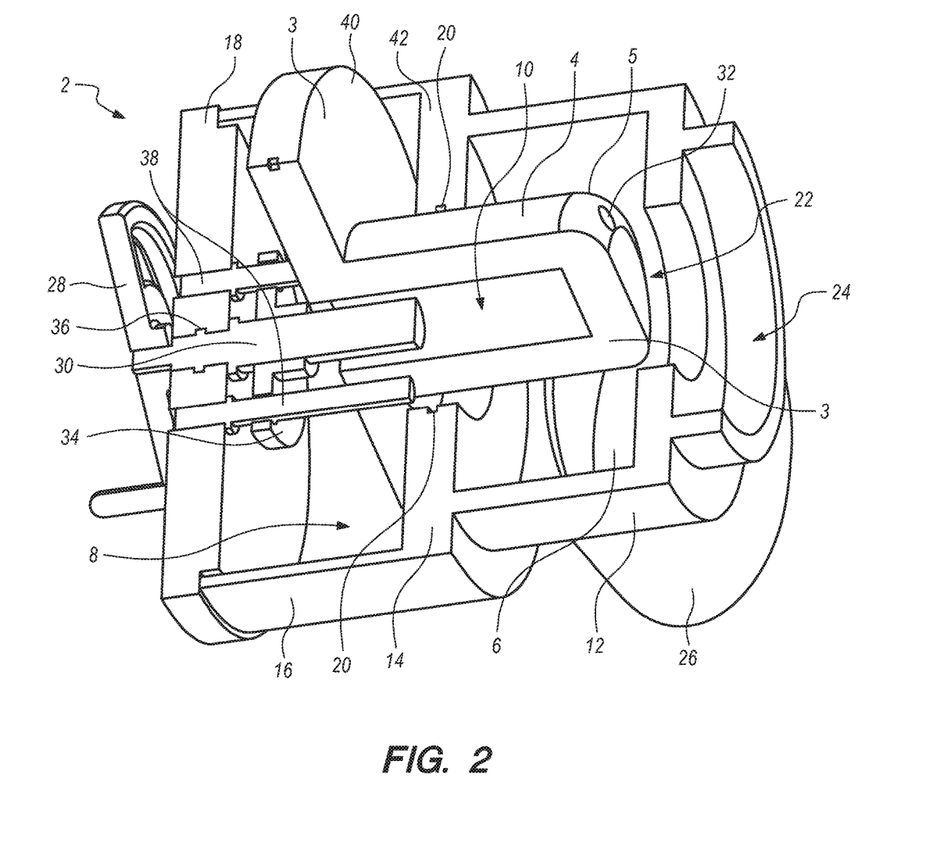
FIG. 2 shows an alternate view of the first embodiment of the pressure regulator of the present invention in partial cut-away.
Figure 11:
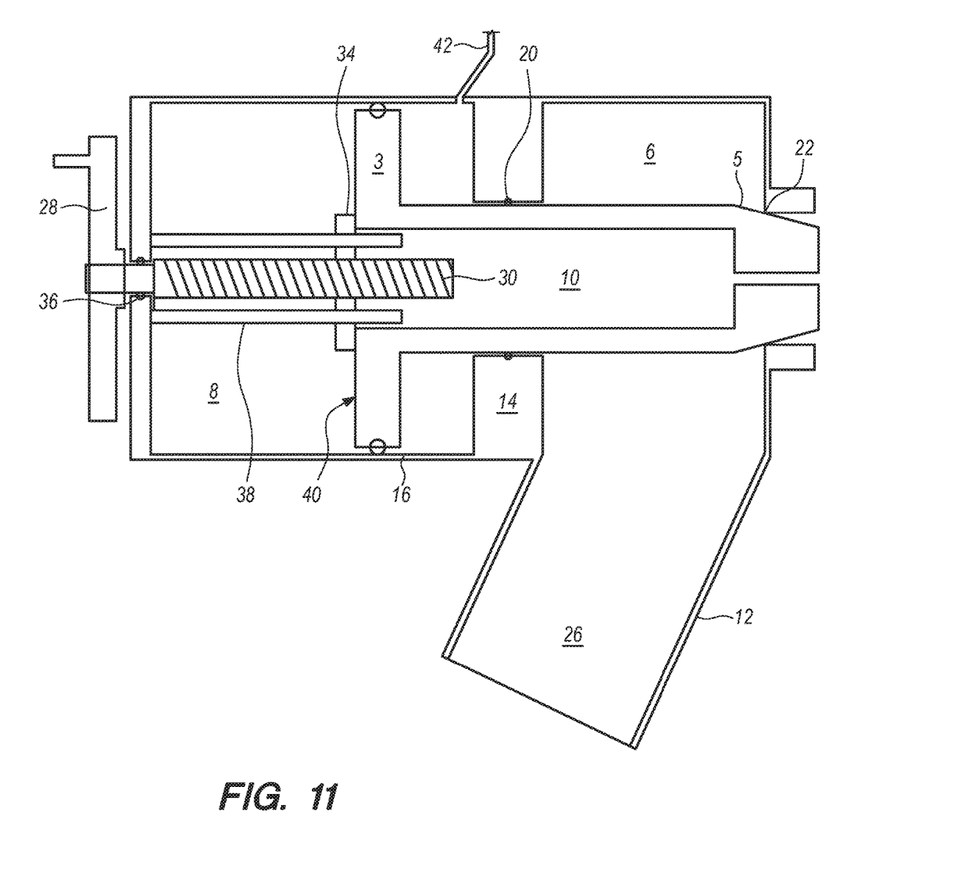
FIG. 11 shows another side cut-away view of the second embodiment of the pressure regulator of the present invention with the piston in a fully closed position.
Figure 12:
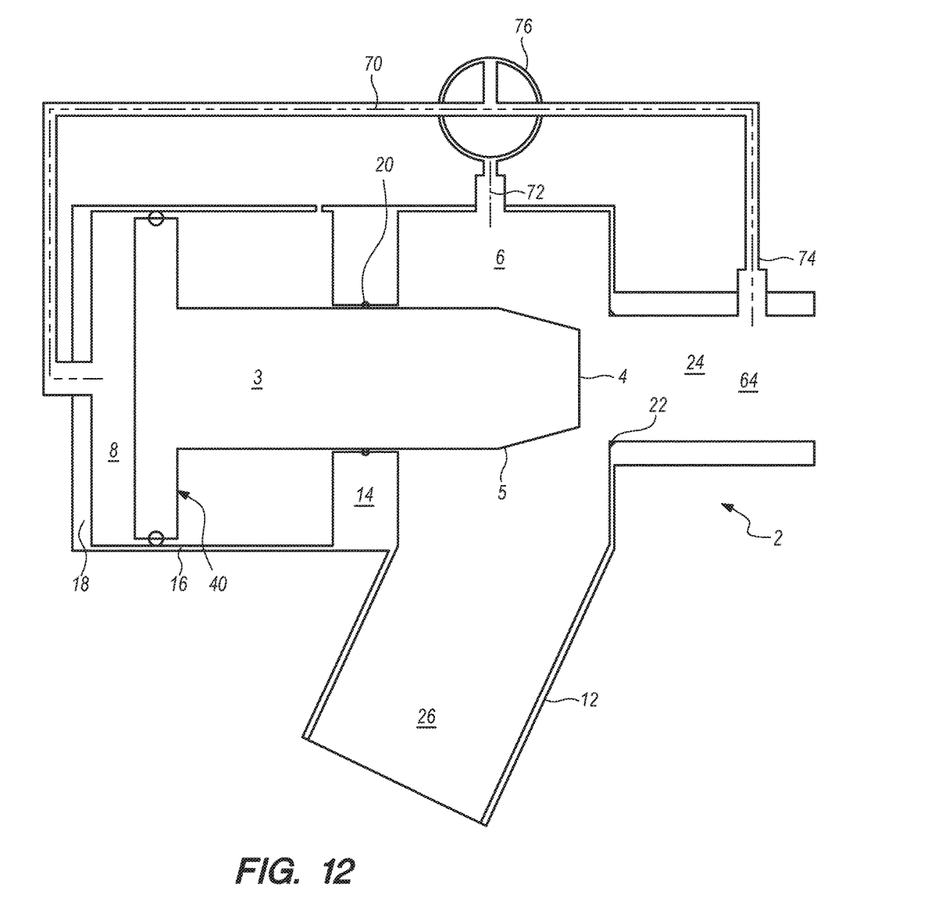
FIG. 12 shows a side cut-away view of a third embodiment of the pressure regulator of the present invention in the open position and having a fluidic bypass and selector valve in a first position.
Figure 13:
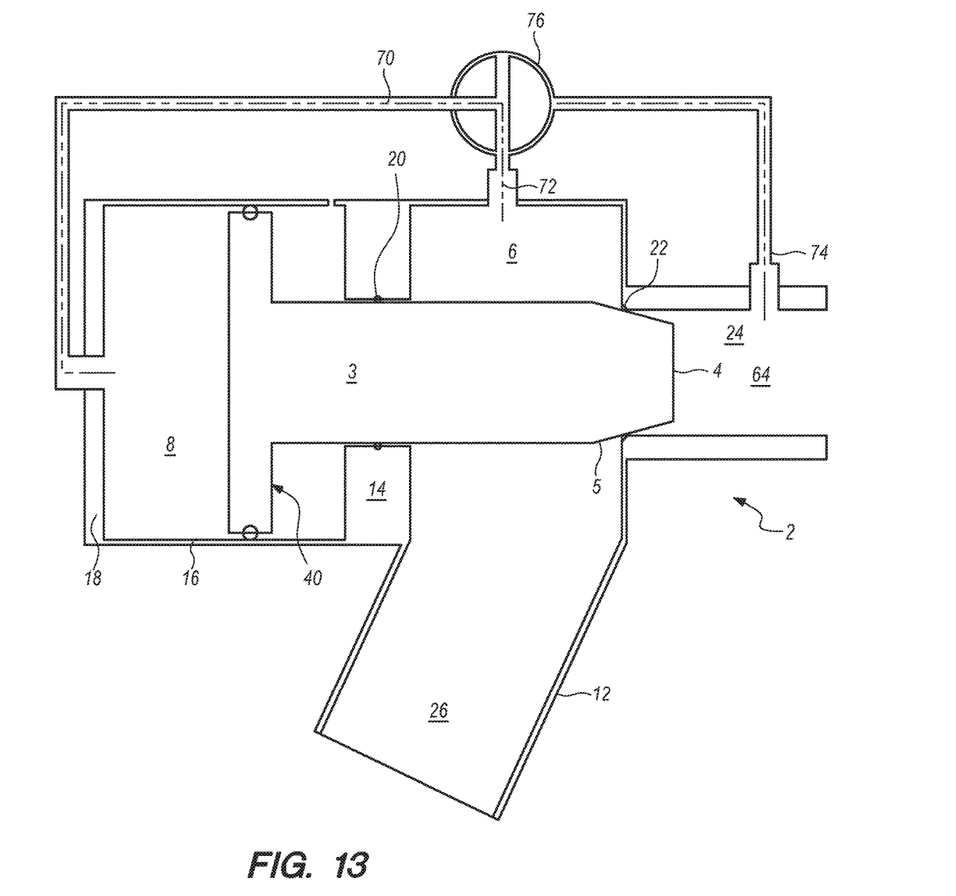
FIG. 13 shows a side cut-away view of a third embodiment of the pressure regulator of the present invention in the fully closed position and having a fluidic bypass and selector valve in a second position.

The present invention is directed toward a single-piston pressure regulator with incorporated shut off mechanism. The pressure regulator may be manufactured as a single integrated piece (as shown in FIGS. 1-2) or may be manufactured as separate pieces that are connected together to form the pressure regulator assembly (as shown in FIGS. 3-11). A bypass is shown in FIGS. 12 and 13. For ease of describing the invention, the components of the pressure regulator may be described herein as being connected. It is understood, however, that the description of elements equally applies to the embodiment in which the components are individually pieces joined together to form the assembly.

Referring now to FIGS. 1-11, the pressure regulator 2 in certain implementations generally has a liquid flow inlet area 26, a pressure chamber (separated into a forward pressure chamber 6 and a rear pressure chamber 8), an outlet port 24 fluidically connected to the forward pressure chamber 6, a head cap 18 enclosing the rear pressure chamber 8, and in some embodiments a hand wheel 28 extending from outside the pressure chamber into the rear pressure chamber 8. These elements are generally enclosed in a housing (preferably a metal housing) which extends generally from the external body of the pressure regulator assembly 2. As shown in FIGS. 1-11, the forward pressure chamber 6 is fluidically connected to both the inlet area 26 and the outlet port 24. Furthermore, the forward pressure chamber 6 and the rear pressure chamber 8 are fluidically connected via a passageway or orifice through the piston 3. Alternatively, in one embodiment, there is no passageway or orifice through the piston 3, and instead forward pressure chamber 6 and rear pressure chamber 8 are fluidically connected by a bypass, as described with reference to FIGS. 12-13 and the detailed description provided herein. The relationship of each of these components with respect to other components will be described more fully below.

The flow inlet area 26 is configured to receive a liquid from a pressurized liquid source. The source may be, for example, a water tank, or water that is mixed with a surfactant either in a tank, or in a line that feeds the water from the tank to flow inlet area. The flow inlet area 26 is connected to the forward pressure chamber 6, which is separate from but connected to a rear pressure chamber 8. As noted above, the rear pressure chamber 8 may be manufactured connected to the forward pressure chamber 6 or may be a separate piece (for example, the ring component shown in FIG. 6) that is configured to be connected to the forward pressure chamber 6, so long as there is a clear division between the chambers 6, 8 (which is generally referred to herein as the dividing surface 14). A piston 3 is situated inside the pressure chamber, with a rearward end 40 of the piston 3 being in the rear pressure chamber 8, the forward end 4 of the piston 3 being adjacent the flow outlet port 24. The shaft of the piston 3 extends through the dividing surface 14 that separates the rear 8 and forward 6 chambers. In one embodiment shown in FIGS. 2, 3, and 9-11, the piston 3 includes an internal bore 32 (or multiple internal bores 32) that provides a fluidic path between flow outlet port 24 and the rearward pressure chamber 8. The outlet port 24 is connected to forward pressure chamber 6 on a side opposite the rear pressure chamber 8, such that pressurized liquid enters the pressure regulator 2 at the flow inlet area 26, flows through the pressure chamber, and exits the valve at the flow outlet port 24.

Alternatively, the piston could be a solid piston that does not allow flow through the piston between the two chambers. Instead, as shown in FIGS. 12 and 13, a fluidic bypass 74 that directs liquid 70 is used to fluidically connect the forward pressure chamber and rearward pressure chamber and to connect the rearward pressure chamber and outlet chamber area and pump suction area. In such an embodiment where the fluidic bypass is implemented, an additional selector valve 76 may be used to control flow through the fluidic bypass. The selector valve 76 preferably has two positions, with the first position fluidically connecting the outlet area or pump suction area to the rear pressure chamber (as shown in FIG. 12) and the second position fluidically connecting the forward pressure chamber and rear pressure chamber at entry point 72, as shown in FIG. 13. When the selector valve 76 is in the first position, flow is regulated through the device. When the valve is in the second position, fluid is allowed to flow from the forward pressure chamber through the bypass into the rearward pressure chamber where it exerts pressure on the rearward face of the piston. This moves the piston forward in the chamber until it is forced against the outlet sealing element, thus stopping flow through the regulator.

Figure 3:
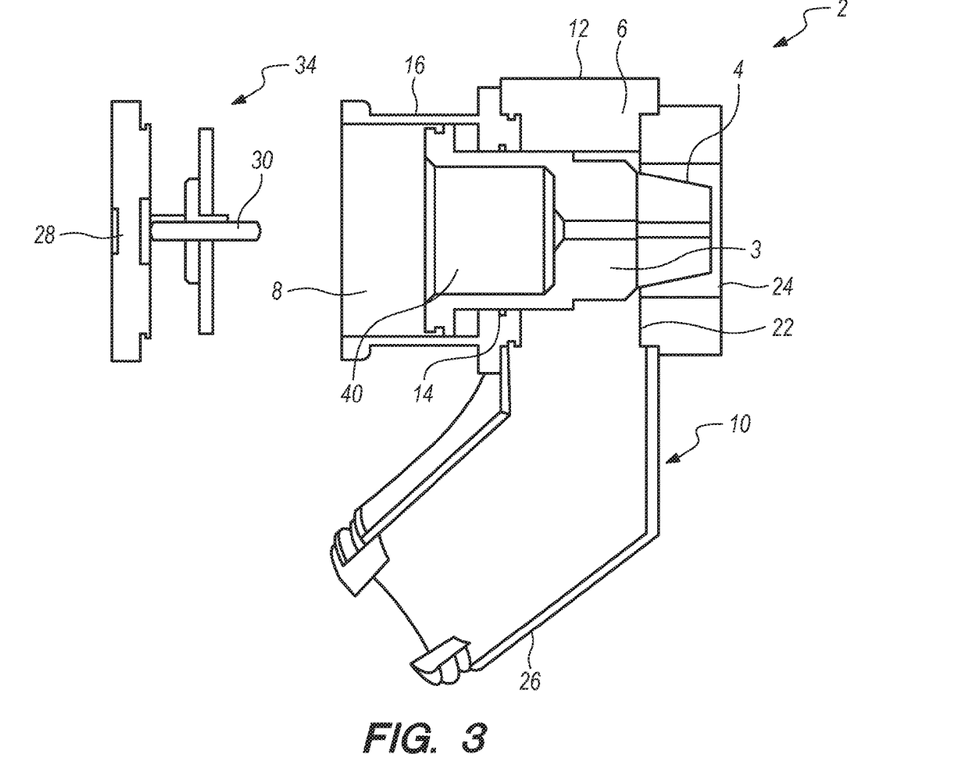
FIG. 3 shows a side, partially exploded view of a second embodiment of the pressure regulator of the present invention, the pressure regulator being a combination of the elements shown in FIGS. 4-8.
Figure 4:
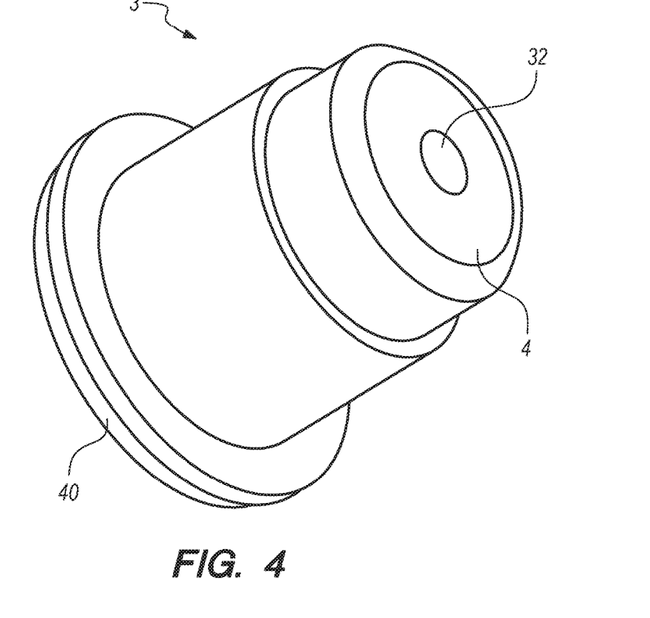
FIG. 4 is a detail view of the piston of the pressure regulator of the embodiment of FIG. 3.
Figure 5:
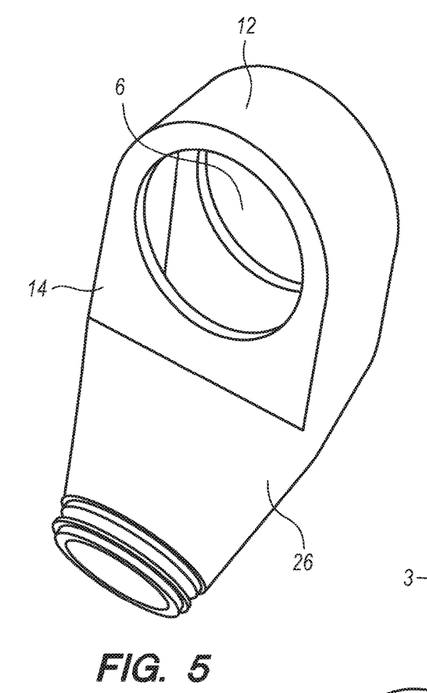
FIG. 5 is a detail view of the flow inlet area and forward pressure chamber of the embodiment of FIG. 3.
Figure 6:
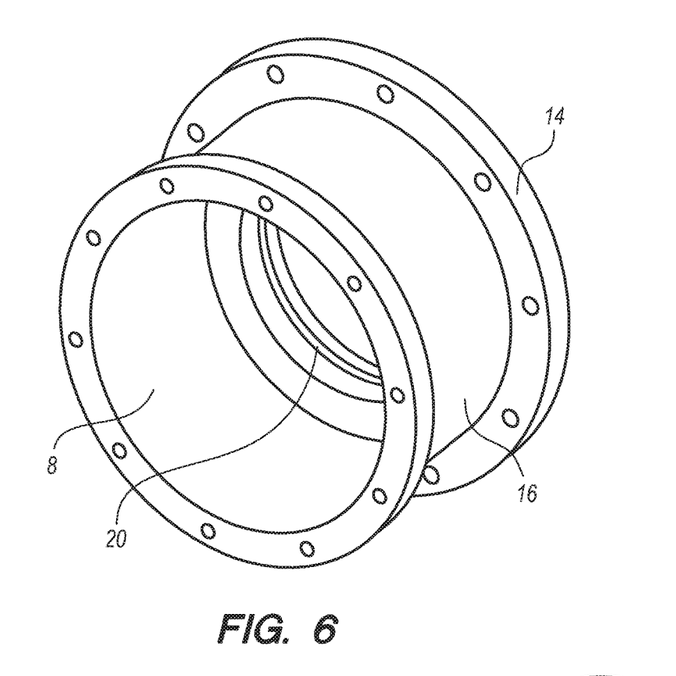
FIG. 6 is a detail view of the rear pressure chamber of the embodiment of FIG. 3.

In one embodiment, the flow inlet area 26 is at a generally 45° angle to the forward pressure chamber housing 12, as shown in FIG. 3. Alternatively, the flow inlet area 26 may be substantially perpendicular to the forward pressure chamber housing, as shown in FIG. 2. It is understood, however, that any other configuration is within the scope of the invention, and various such configurations may be required in order to fit within available space, particularly in tight-fitting applications such as on a firetruck with CAFS equipment. Flow of the liquid enters the flow inlet area 26 and exits the pressure regulator through the outlet port 24.

The piston 3 is fitted to slide longitudinally within the pressure chamber along an axis that extends from the centerline of the outlet port 26 to the centerline of the head cap 18 enclosing the rear pressure chamber 8. As noted above, in certain embodiments an internal bore 32 (or bores 32) in the piston 3 allows the flow of the liquid from the outlet port 24 through the piston 3 to the rear pressure chamber area 6, and vice versa. The piston 3 has a number of faces that are positioned in different areas of the pressure chamber. In one embodiment, the piston 3 has a forward face 4 and a rearward face 40, with a beveled surface 5 adjacent to forward face 4. The forward face 4 of the piston 3 is situated inside the forward pressure chamber 6, while the rearward face 40 of the piston 3 is situated inside the rearward pressure chamber 8. These faces 4, 40 as well as beveled surface 5 serve as points on the piston 3 on which the liquid exerts forces causing the piston 3 to move longitudinally within the pressure chamber. The ratio of the area of the rearward face 40 to that of the area of forward face 4 and beveled area 5 of the piston 3 is directly correlated to the proportional reduction of pressure; therefore, the sizes of each of the faces and beveled area of the piston 3 may be modified to achieve a desired reduction proportion of the pressure. For example, given a ratio of the area of the rearward piston face 40 to forward piston face 4 and beveled area 5 of seven, regulated discharge of any pressure range within the range of inlet pressure divided by seven may be achieved. Thus, a hydrant pressure of 70 psi, for example, would permit a regulated range from 10 psi to 70 psi. This is particularly useful with the embodiment shown in FIG. 9, which contains pressure sensor switches and control valves for allowing inlet pressurized air pressure control (discussed more fully below).

The shaft of the piston 3 extends from the rear face 40 of the piston 3 to the forward face 4 of the piston 3. The shaft of the piston 3 extends through the dividing surface 14 dividing the rear pressure chamber 8 from the forward pressure chamber 6. Seals 20 are situated at the dividing surface 14 between the forward pressure chamber 6 and the rearward pressure chamber 8. These seals 20 provide a liquid-tight seal, which allows the piston 3 to move along its longitudinal axis while preventing liquid from flowing between the forward chamber 6 and rearward chamber 8 other than, in one embodiment, through the bore 32 of the piston 3, or in an alternative embodiment, through the fluidic bypass. In one embodiment, a middle face of the piston 3 is situated forward of the rear face 40 of the piston. The middle face is of a lesser outside diameter than rear face 40 and engages the inside diameter of an inside lip of the rear chamber body housing 16. In one embodiment, a rear face seal fits in a corresponding recess in the inside the lip and provides a seal at this point between the piston 3 and the inside lip of the rear chamber housing 16. This seal serves to act as the seal 20 at the dividing surface 14. The forward face 4 of the piston 3 has an outside diameter less than that of the middle face of the piston 3, and therefore does not engage with the rear chamber housing 16 or forward chamber housing 12.

Figure 7:
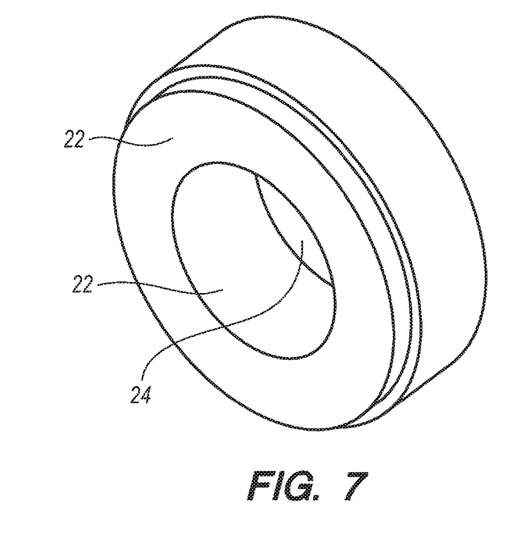
FIG. 7 is a detail view of the outlet port of the embodiment of FIG. 3.

One embodiment of the pressure regulator 2 of the present invention implements a sealing element 22 near the outlet port 24 that is configured to prohibit the flow of liquid from the pressure regulator 2 when the valve is closed (i.e. piston 3 is in the fully forward position). In one embodiment, this sealing element 22 may be a valve seat located forwardly of the piston 3 and adjacent the outlet port 24, the valve seat being manufactured integral to the regulator housing. As noted above, in one embodiment the pressure regulator 2 may comprise a number of separate pieces that are mechanically connected. In such an embodiment, the sealing element 22 may be an outlet ring that is connected to the regulator housing after manufacture, the outlet ring serving as both the sealing element 22 and the outlet port 24 (as shown in FIG. 7).

In yet another embodiment, the piston 3 may have an additional beveled face 5 on the forward end of the piston 3. This beveled face 5 is configured fit inside or rest against the sealing element 22 at the outlet area 24 of the regulator 2 when the valve is fully closed (i.e., the piston 3 is in a fully forward position, as shown, for example, in FIG. 11). In this embodiment, the beveled face 5 has a roughly frustoconical shape such that as the piston 3 moves rearward (and thus the valve begins to open) there is a proportional increase in flow of liquid out of the pressure chamber through the outlet port 24 toward the attached pump or equipment (not shown except in FIG. 9 as described below).

Figure 9:
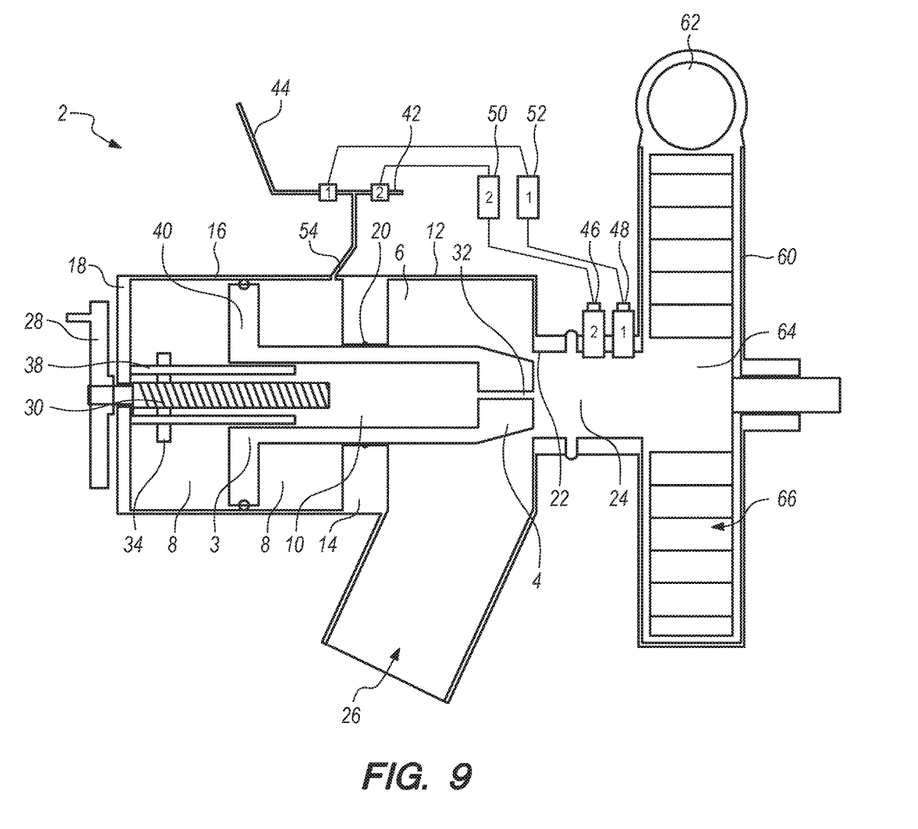
FIG. 9 shows a third embodiment of the pressure regulator of the present invention in side cut-away view, having pressure sensors in communication with pressure valves by means of relays, with the valves located in communication with the pressurized air source to set a minimum and maximum input pressure.
Figure 10:
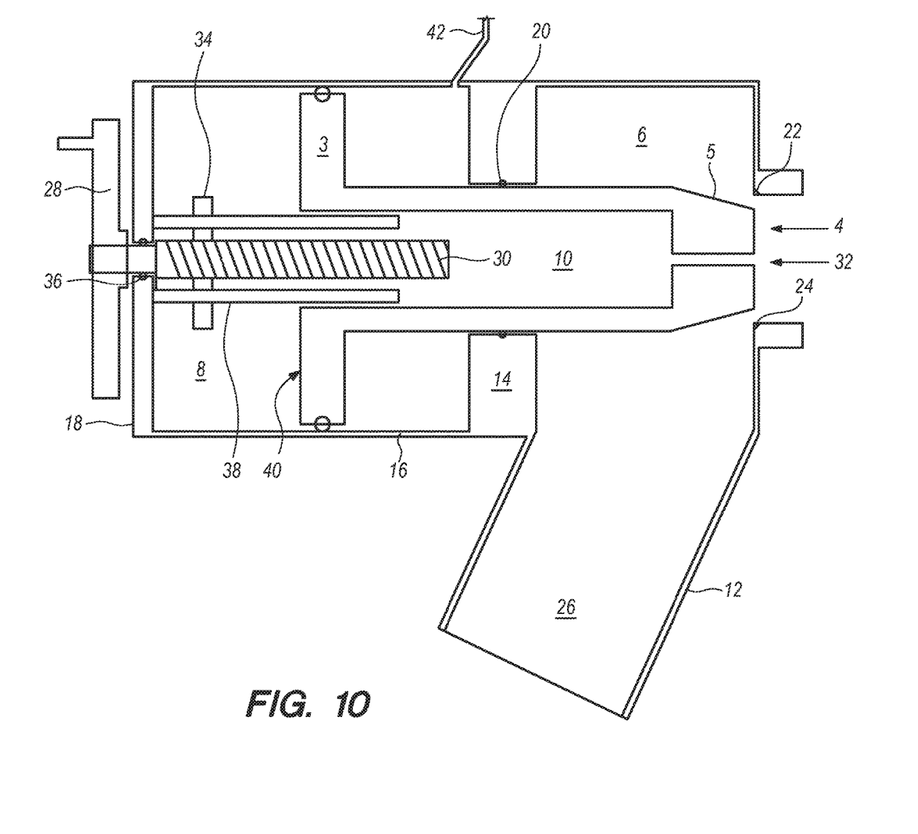
FIG. 10 shows another side cut-away view of the second embodiment of the pressure regulator of the present invention with the piston in a partially open position.

As noted above, in certain embodiments the shaft of piston 3 contains an internal bore 32 (or a number of internal bores 32) that act as a liquid path extending from the forward face 4 of the piston 3 down the shaft of the piston 3 to rear face of the piston 40. Alternatively, as mentioned above, a liquid path between the rear pressure chamber (and rear face of piston) and forward pressure chamber (and forward face of piston) is created by the fluidic bypass. This internal bore 32 or fluidic bypass allows pressure from the outlet port 24 to exert pressure in the rear pressure chamber 8 at all times that flow is present. In one embodiment, as shown, for example, in FIGS. 10 and 11, the assembly also contains a vent 42 to the atmosphere. A seal prevents flow from the forward pressure chamber 6 into the vented area. This vent 42 allows for the free movement of the piston 3 in a longitudinal direction along the axis of the pressure chamber without an interfering force due to air pressure or vacuum as the piston 3 moves. In one embodiment air flow through the vent 42 to the atmosphere may be controlled via an air valve "1", as shown in FIG. 9. Furthermore, a second air valve "2" may be used to control air flow from a pressurized air source. Air flow may be introduced into the rear pressure chamber forward the rearward face 40 of the piston 3 via this pressurized air source, as shown in FIG. 9. These valves are controlled by pressure sensor switches 46 and 48 located adjacent to the outlet port, which may be adjacent, for example, to a pump suction area 64 of a pump 60 to which the flow regulator is attached. The pump 60 may include a pump discharge 62 and pump impellor 66, as further shown in FIG. 9. These pressure sensor switches 46 and 48 communicate through relay switches 50 and 52, respectively, with the air valves "2" and "1", respectively, and may be either set at the factory or adjusted to keep the pressure regulator within a desired pressure range. For example, for a desired pressure range between 20 psi and 30 psi, the first sensor switch 48 opens the air valve "1" for the pressured source thereby allowing air flow from the pressurized air source into the rear chamber 8 at a point forward the rear face of the piston 6 until 30 psi of pressure in the suction intake of the pump 3 is achieved. When the pressure exceeds 30 psi, the second sensor switch 46 opens the air valve "2" for the atmospheric vent 42, allowing the pressure to drop until it is within the desired range. The sensors preferably have an adjustable open-closed band.

Figure 8:
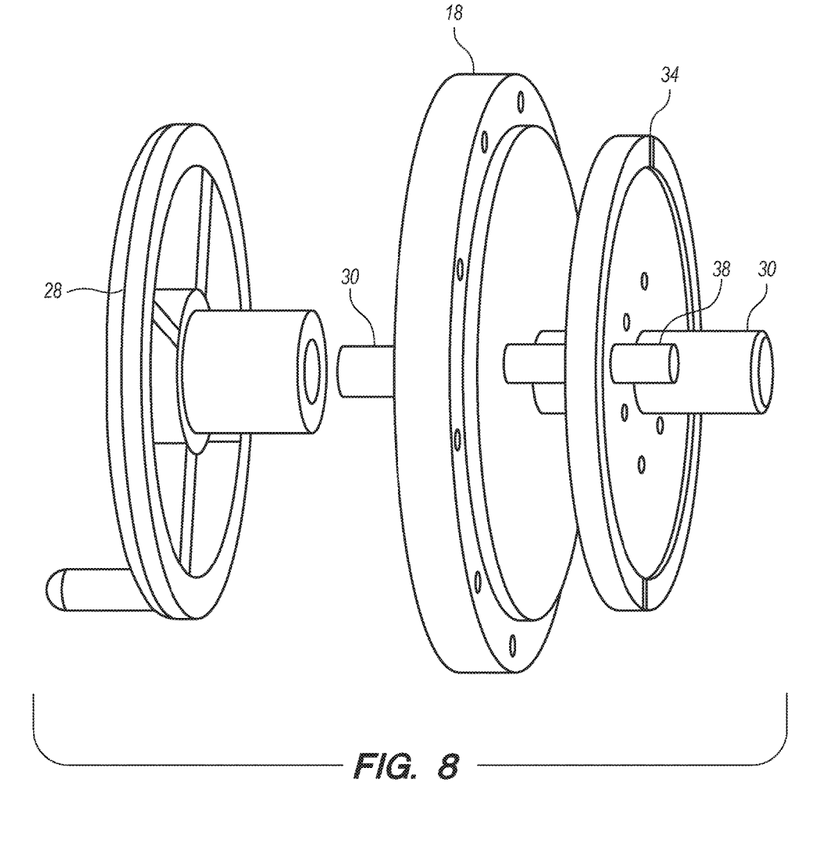
FIG. 8 is a detail view of the hand wheel assembly of the embodiment of FIG. 3.

As noted above, in one embodiment of the pressure regulator assembly 2 according to the present invention, the pressure regulator 2 uses a wheel 28 to control the movement capabilities of the piston 3. In one embodiment, a substantially circular hand wheel 28 may be implemented (as shown in FIG. 1-3 and FIG. 8). It is understood that any variation of wheel shape may be used, so long as the wheel 28 may be used to rotate a threaded shaft 30 connected to the wheel 28, thereby moving a plate 34 in a forward or rearward position to change the area in which the piston 3 may move. The hand wheel 28 is connected to one end of the threaded shaft 30, while the plate 34 is located at the other end of the threaded shaft 30. As indicated above, a head cap 18 is connected to the rear pressure chamber 8 and this head cap 18 serves to enclose the rear pressure chamber 8. This head cap 18 may be manufactured integral to the housing 16 of the rear pressure chamber 8 (as shown in FIGS. 1-2) or may be a separate piece positioned between the moveable plate 34 and the hand wheel 28 that is configured to be fitted, by welding, bolts, or other means to the end of the rear pressure chamber housing 16 (as shown in FIG. 8). In either event, the head cap 18 is configured such that the threaded shaft 30 extends through the head cap 18 and into the rear pressure chamber 8. The hand wheel 28 remains on the exterior of the rear chamber housing 16 such that the wheel 28 can be accessed by the user during use of the regulator 2. The rotation of the hand wheel 28 by the user in turn causes the threaded shaft 30 to rotate, thus causing the movable plate 34 to move forward or rearward in the rear chamber area 8.

In one embodiment, the threaded shaft 30 may extend from the hand wheel 28 into a hollow portion 10 of the piston 3. This hollow portion 10 of the piston 3 is designed to receive the end of the threaded shaft 30, but not to contact the threaded shaft 30 so that the piston 3 is not prohibited from sliding by the threaded shaft 30. The hollow portion 10 may be the same internal bore 32 described above (as shown in FIG. 9) or may be a separate hollow bore 10 as shown in FIGS. 1-2. In one embodiment, guide pins 38 are used to prohibit the movable plate 34 from rotating as the threaded shaft 30 is rotated, thus allowing the plate 34 to only move forward or rearward depending on the rotation of the hand wheel 28. The guide pins 38 are preferably threaded into the end cap 18 at one end with the other ends extending through the moveable plate 34. In on embodiment, the guide pins 38 extend into ported areas in the piston 3 to secure the piston 3 to the guide pins while also allowing piston 3 to move freely toward and away from the sealing element 22 at the outlet port 24 in order to control the flow of water out of the outlet port 24. The outer diameter of the moveable plate 34 is such that it will engage the rear face 40 of piston 3 as the plate 34 moves forward, thus limiting the rearward movement of piston 3. As the plate 34 continues to move into the rearward face 40 of the piston 3, the plate 34 forces the piston 3 into the sealing element 22 of the outlet port 24, thereby preventing flow of water through the outlet port 24 altogether.

The structure of the apparatus 2 having now been described, its operation may be described as follows. Generally speaking, pressurized liquid flows from a pressurized liquid source into the forward pressure chamber 6 through the fluid inlet area 26. This flow of liquid will exert a pressure at the forward face 4 of the piston 3. In one embodiment, pressure will also be exerted on a portion of the beveled face 5 of the piston 3. This exertion of pressure on the forward face 4 and beveled face 5 moves the piston 3 rearward, which serves to open the valve to allow flow from the forward pressure chamber 6 through the outlet port 24.

As pressure builds, liquid 70 will begin to flow through the internal bore 32 or bores 32 in the piston 3 (or alternatively through the fluidic bypass 74, so long as the selector valve 76 is in the second position, thus fluidically connecting the forward pressure chamber and rearward pressure chamber) and move to the rear pressure chamber 8. This causes pressure to build in the rear pressure chamber 8. As the pressure in the rear pressure chamber 8 builds, the liquid exerts a force on the rear face 40 of the piston 3, thereby pushing the piston 3 back forward until the pressures at the rear 40 of piston 3 and at the front 4 and beveled face 5 of the piston 3 equalize, thus creating a regulation of the pressure of liquid that flows out of the outlet port 24. The precise position at which piston 3 reaches equilibrium may be modified by varying the areas of the forward parts of the piston 3 (forward face 4 and beveled face 5 of the piston 3) proportionally to the area of the rear of the piston (rear face of piston 40). In one embodiment, the rearward end 40 of piston 3 has a diameter of 6" whereas the diameter of piston 3 forward of the rearward piston face 40 is 4½" and the diameter of the seat 22 in the outlet area is 3¾". Because the area onto which liquid pressure may be asserted is greater behind piston 3 than the area in front of piston 3, it may be seen that as pressure builds behind piston 3 due to flow through bore 32 or fluidic bypass, the pressure to force piston 3 forward (and thereby regulate flow through the regulator 2) will increase. When beveled face 5 is pressed into contact with seat 22 at outlet port 24, the valve is in the fully closed position, as shown in FIG. 11.

The hand wheel 28 provides a manual means to override the automatic pressure regulation of the regulator 2. By turning hand wheel 28, movable plate 34 may be moved forwardly or rearwardly depending upon the direction of rotation. Using right hand threads, turning hand wheel 28 clockwise would cause movable plate 34 to more forwardly, but the invention is not so limited. It may be seen that the position of movable plate 34 within the interior of the rear chamber 8 provides a stop to the maximum rearward movement of piston 3, and thus provides a manual override function to the degree to which the valve may open under automatic operation. If hand wheel 28 is turned such that movable plate 34 is fully forward, then it presses the beveled face 5 fully against the sealing element 22 of the outlet port 24, thereby stopping the passage of liquid through outlet port 24, and therefore stopping all flow through the valve. Although hand wheel 28 is shown as a manually controlled wheel 28 in the illustrated implementation, various electronic, hydraulic, pneumatic, or other powered control means could be used to actuate the position of moveable plate 34.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included in the disclosure. All references cited herein are hereby incorporated by reference to the extent that there is no inconsistency with the disclosure of this specification. If a range is expressed herein, such range is intended to encompass and disclose all sub-ranges within that range and all particular points within that range.

The present invention has been described with reference to certain embodiment(s) that are intended to be exemplary only and not limiting to the full scope of the present invention as set forth in the following claims.

The invention claimed is:

1. A pressure regulator for regulating the flow of a liquid from a pressurized liquid source, the pressure regulator comprising:
   a. an inlet area;
   b. a main pressure chamber comprising
      i. a forward pressure chamber having a first end and a second end, wherein the forward pressure chamber is connected to the inlet area; and
      ii. a rearward pressure chamber having a first end and a second end, wherein the first end of the rearward pressure chamber is configured to be joined to the second end of the forward pressure chamber by a dividing surface, wherein the second end of the rearward pressure chamber comprises a head cap;
   c. an outlet port adjacent to the forward pressure chamber at an end opposite the rearward pressure chamber;
   d. a piston having a forward end and a rearward end and a shaft, wherein the forward end of the piston comprises a first face of the piston positioned inside the forward pressure chamber and the rearward end of the piston comprises a second face of the piston configured to be positioned inside the rearward pressure chamber, further wherein the piston is configured to slide longitudinally through the main pressure chamber, and further wherein the forward end of the piston comprises a beveled face adapted to seal against the outlet port when the piston is in a fully forward position thereby preventing the flow of liquid through the pressure chamber;

e. a fluidic bypass fluidically connecting the rearward pressure chamber to the outlet port and the forward pressure chamber;

f. a selector valve positioned in-line with the fluidic bypass wherein the selector valve is movable from a first position to a second position, wherein when in the first position the selector valve allows a flow of liquid only between the rearward pressure chamber and the outlet port whereby liquid may pass through the bypass even when the piston is in the fully forward position, and when in the second position the selector valve allows the flow of liquid only between the rearward pressure chamber and the forward pressure chamber whereby liquid may not pass through the bypass when the piston is in the fully forward position;

g. a threaded shaft extending through the head cap into the rearward chamber;

h. a wheel connected to threaded shaft, wherein the wheel is configured to be rotated, thereby rotating the threaded shaft;

i. a movable plate positioned inside the rearward pressure chamber, wherein the movable plate is configured to prohibit the piston from sliding rearwardly through a portion of the main pressure chamber past a position of the plate in the rearward pressure chamber; and j. a plurality of guide pins connected to the head cap, wherein the guide pins are configured to prohibit the movable plate from rotating when the wheel is rotated.

2. The pressure regulator of claim 1, wherein the rearward pressure chamber comprises a vent, wherein the vent is positioned forward the second face of the piston.

3. The pressure regulator of claim 2, further comprising a first air valve and a first pressure sensor, wherein the first pressure sensor is positioned adjacent and downstream of the outlet port and the first pressure sensor is in communication with the first air valve whereby a reading at the first pressure sensor serves to control an operation of the first air valve.

4. The pressure regulator of claim 3, further wherein the rearward pressure chamber comprises a pressurized air inlet, wherein the pressurized air inlet is configured to receive pressurized air from a pressurized air source, further wherein the pressurized air inlet is positioned forward the second face of the piston.

5. The pressure regulator of claim 4, further comprising a second valve and a second pressure sensor, wherein the second pressure sensor is positioned adjacent and downstream of the outlet port and the second pressure sensor is in communication with the second air valve whereby a reading at the second air valve serves to control an operation of the second air valve.

6. The pressure regulator of claim 1, further comprising at least one sealing ring positioned at the dividing surface.

7. A pressure regulator, comprising:

a. a pressure chamber comprising an inner diameter, an annular dividing wall dividing the pressure chamber into a rearward chamber and a forward chamber, an outlet port, and a first bypass fluidically connecting the reward chamber and forward chamber whereby liquid may flow through the first bypass;

b. a valve positioned to slide longitudinally within the pressure chamber, wherein the valve comprises a rear face comprising an outer diameter that engages with the inner diameter of the pressure chamber, a body that engages with the dividing wall, and a beveled face positioned at a forward end of the valve to seal the pressure chamber when the valve is in a fully forward position;

c. a longitudinally movable plate positioned in the reward chamber rearwardly of the valve rear face, whereby the movable plate is configured to stop rearward movement of the valve in the pressure chamber when the rear face of the valve contacts the movable plate;

d. a wheel mechanically linked to the movable plate whereby turning of the wheel serves to move the movable plate longitudinally;

e. a threaded wheel shaft mechanically connecting the wheel and movable plate; and f. at least one guide pin connected at the rearward chamber and passing through a corresponding passage in the rearward plate whereby the movable plate is prevented from rotating in response to a turning of the wheel and the threaded wheel shaft.

8. The pressure regulator of claim 7, further comprising an atmospheric vent in the chamber forward of the piston rear face.

9. The pressure regulator of claim 8, further comprising a first air valve connecting a pressurized air source to the pressure chamber forward of the piston rear face, whereby the first air valve is configured to control a flow of pressurized air into the pressure chamber.

10. The pressure regulator of claim 9, further comprising a second air valve connecting the pressurized air source to the vent, whereby the second air valve is configured to control a maximum pressure in the pressure chamber by venting air to the atmospheric vent when a maximum pressure has been reached.

11. The pressure regulator of claim 10, further comprising first and second air sensors connected to the first and second air valves, respectively, wherein the first and second air sensors are positioned forward of the outlet port in a fluidic path downstream of the pressure chamber.

12. The pressure regulator of claim 11, further comprising a second bypass fluidically connecting the rearward chamber to a point forward the outlet port, whereby liquid may flow through the second bypass.

13. The pressure regulator of claim 12, further comprising a selector valve connected to the first bypass and second bypass, wherein the selector valve is configured to allow the flow of liquid through one of the first bypass and second bypass and to prohibit the flow of liquid through the other of the first bypass and second bypass.

* * * * *